United States Patent [19]

Gutleber

[11] Patent Number: 4,568,915
[45] Date of Patent: Feb. 4, 1986

[54] CODE GENERATOR FOR MULTILEVEL INTERLEAVED MULTIPLEXED NOISE CODES

[75] Inventor: Frank S. Gutleber, Little Silver, N.J.

[73] Assignee: The United States of America as represented by the Secretary of the Army, Washington, D.C.

[21] Appl. No.: 550,853

[22] Filed: Nov. 14, 1983

[51] Int. Cl.⁴ .......................................... H03K 13/24
[52] U.S. Cl. .............................. 340/347 DD; 375/17; 375/25; 375/96
[58] Field of Search .................. 340/347 DD; 375/17, 375/25, 96; 371/40, 44, 45

[56] References Cited

U.S. PATENT DOCUMENTS 3,461,451 8/1969 Gutleber .
3,634,765 1/1972 Gutleber .................... 375/96
4,293,953 10/1981 Gutleber .

Primary Examiner—Clifford C. Shaw
Attorney, Agent, or Firm—Anthony T. Lane; Sheldon Kanars; Jeremiah G. Murray

[57] ABSTRACT

Expanded multilevel noise codes are generated of a type termed "code mates" having autocorrelation functions which, upon detection in a matched filter, provide an impulse autocorrelation function. More particularly, expanded multilevel code mate pairs are generated by interleaving two multi-bit codes comprising a mate pair wherein one of the codes in each expanded mate pair comprises a code having a larger amplitude than the other code and whose position is mutually transposed in the expanded mate pairs and further wherein one of the interleaved codes is the complement or negative of one of the original or basic code mates.

23 Claims, 4 Drawing Figures

CODE GENERATOR FOR MULTILEVEL INTERLEAVED MULTIPLEXED NOISE CODES

The invention described herein may be manufactured, used and licensed by or for the Government for governmental purposes without the payment of any royalties thereon or therefor.

CROSS REFERENCE TO RELATED APPLICATIONS

This invention is related to the following co-pending aplications filed in the name of the present inventor and which are specifically incorporated herein by reference:

U.S. Ser. No. 499,727, entitled, "Code Generator For Interleaved Multiplexed Noise Codes", filed on May 31, 1983;

U.S. Ser. No. 533,183, entitled, "Multilevel Noise Code Mate Pair Generation And Utilization Of Such Codes", filed in the name of the present inventor on Sept. 19, 1983; and U.S. Ser. No. 536,064, entitled, "Expanded Multilevel Noise Code Generator Employing Butting", filed in the name of the present inventor on Sept. 26, 1983.

FIELD OF THE INVENTION

This invention relates generally to the generation of multiplexed noise codes having autocorrelation functions which upon detection in a matched filter provide an impulse autocorrelation function and more particularly to the generation of multilevel noise codes resulting from the expansion of multilevel, multiplexed code mate pairs by the process of interleaving.

BACKGROUND OF THE INVENTION

Radio communication systems utilizing multiplexed noise codes are generally known. A typical example is shown and described in U.S. Pat. No. 4,293,953, entitled, "Bi-Orthogonal PCM Communications System Employing Multiplexed Noise Codes", which issued to Frank S. Gutleber, the present inventor, on Oct. 6, 1981.

The concept of code expansion for the general class of multiplexed noise codes comprised of code mate pairs having autocorrelation functions which upon detection with a matched filter provide an impulse autocorrelation function is also generally known. One known expansion concept involves the butting of one code mate with the other code mate and is a technique disclosed, for example, in U.S. Pat. No. 3,461,451, entitled, "Code Generator To Produce Permutations Of Code Mates", which issued to the present inventor on Aug. 12, 1969.

In the above referenced related application U.S. Ser. No. 499,727 entitled, "Code Generator For Interleaved Multiplexed Noise Codes", there is disclosed a method and apparatus for generating a pair of expanded multiplexed noise codes resulting from interleaving one code mate with the other code mate and is achieved by delaying one of the code mates by a time delay equal to one half the interpulse period of the code mate pairs and adding it to the other code mate to form a first interleaved code mate, while a second interleaved code mate is generated by forming the negative of the delayed code mate and adding it to the other code mate. The interleaved code mates then comprise twice the number of code bits and the process is repeated; however, the code delay is reduced by half for each succeeding interleaving stage. The process can be repeated until the delay is equal to the pulsewidth of each code bit, whereupon a code sequence is provided wherein each available time slot is filled with a code bit.

In the above referenced related application, U.S. Ser. No. 533,183, entitled, "Multilevel Noise Code Mate Pair Generation And Utilization Of Such Codes", there is disclosed a pulse code modulator communications system employing multiplexed noise code mate pairs comprised of a pair of bi-polar digital code mates having more than one amplitude level and employing basic code mate pairs of at least two code bits each wherein one code mate is comprised of two signal bits of first and second polarities with one bit having a larger amplitude than the other bit and wherein the other code mate is comprised of two signal bits of the second polarity and one bit has a larger amplitude than the other bit.

In the above referenced related application U.S. Ser. No. 536,064, entitled, "Expanded Multilevel Noise Code Generator Employing Butting", there is disclosed the concept of the generation of code mate pairs comprising a pair of expanded noise code mates having code portions of more than one amplitude level and which are generated by butting noise code mates of different amplitude levels such that mutually transposed butted code mates in the expanded code mate pairs have respective code bits which are amplified by a predetermined gain factor and wherein one of the butted code mates comprises a complement or negative of one of the original code mates.

Accordingly, it is an object of the present invention to provide an improvement in the generation of noise codes.

Another object of the present invention is to provide an improvement in the generation of multiplexed code mate pairs having more than one amplitude level.

Still another object of the invention is to provide an improvement in the generation of multilevel, multiplexed code mate pairs generated by the process of interleaving code mates.

SUMMARY

These and other objects are achieved by the generation of code mate pairs comprising a pair of expanded noise code mates having code portions of more than one amplitude level and which are generated by interleaving code mates of different amplitude levels such that mutually transposed interleaved code mates in the expanded code mate pairs have respective code bits which are amplified by a predetermined gain factor and wherein one of the interleaved code mates comprises the complement or negative of one of the original code mates. For example, where a basic code mate comprises code $a = a_1, a_2, a_3 \ldots a_n$ and the other basic code mate comprises code $b = b_1, b_2, b_3 \ldots b_n$, an expanded mate pair is formed by interleaving codes a and b to form expanded codes $A = (a)I\ (b^K)$ and $B = (a^K)\ I\ (\bar{b})$ where the exponent K represents an amplification factor applied to the code bits of codes a and b, $\bar{b}$ represents the complement or negative of code b and I signifies that the two codes a and b are interleaved, e.g., $aIb = a_1, b_1, a_2, b_2, \ldots, a_n, b_n$. In the expansion process, any of the four code portions or segments a, $a^K$, b, and $b^K$ making up the expanded code may be inverted or made negative and the amplified code portions can, when desired, be transposed. Thus code mates can be expanded into longer codes $A_n$ and $B_n$ by repeatedly interleaving codes in accordance with the expressions $A_{i+1} = (A_i)I$ $(B_i^{K_i})$ and $B_{i+1}=(A_i^{K_i}) I (\overline{B_i})$ where i is the $i_{th}$ expansion stage and the exponent $K_i$ is the amplification factor for the $i_{th}$ stage.

DESCRIPTION OF THE PREFERRED EMBODIMENT

Figure 1:
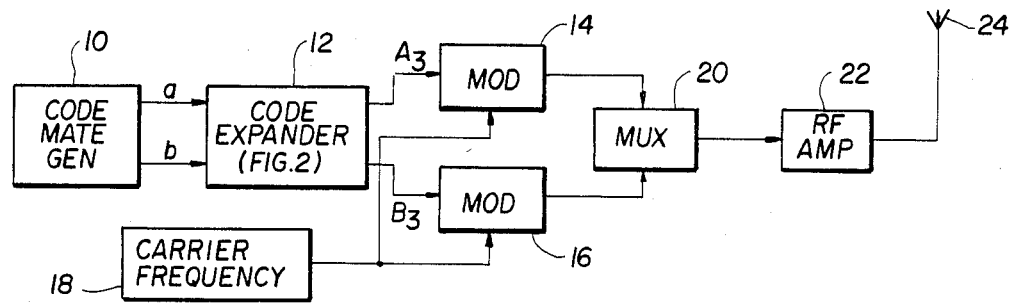
FIG. 1 is a functional block diagram illustrative of transmitting apparatus included in a noise modulated communications system utilizing multilevel interleaved noise code mates generated in accordance with the principles of this invention.

The present invention is directed to digital codes referred to as noise codes, meaning that the information is coded with a code that is "noise like" and that will compress to an impulse when detected with a matched filter. In particular, one class of noise codes are known wherein pairs of coded signals termed "code mates" have autocorrelation functions which provide a peak output at a given time and a zero output or outputs having the same amplitude with opposite polarity, at all other times. When code mate signals, for example, are multiplexed, matched filter detected and linearly added, there is provided a lobeless impulse output of a relatively high amplitude at one given time ($\tau=0$) and a zero output at all other times ($\tau\neq 0$). Mathematically, for a pair of code mates a and b, $$\phi_a(\tau) = -\phi_b(\tau) \quad (1)$$

for all $\tau\neq 0$, where $\phi_a(\tau)$ is the autocorrelation function of code a, $\phi_b(\tau)$ is the autocorrelation function of code b and wherein $\tau=0$ is the location of the main lobe.

The present invention is directed to the expansion and utilization of multilevel code mate pairs which not only meet the requirements of equation (1), but which are generated by interleaving equal length code mates $a=A_o$ and $b=B_o$ where, for example, $a=a_1, a_2, a_3 \ldots a_n$ and $b=b_1, b_2, b_3 \ldots b_n$ in accordance with the expressions:

$$A_1 = (a)I(b^K) \quad (2)$$

$$B_1 = (a^K)I(\overline{b}) \quad (3)$$

where the exponent K signifies an amplitude gain factor applied to the code bits of code mates a and b, $\overline{b}$ represents the complement or negative of code b and wherein I signifies that the expanded codes $A_1$ and $B_1$ result in $A_1 = a_1, b_1^K, a_2, b_2^K \ldots a_n, b_n^K$ and $B_1 = a_1^K, b_1, a_2^K, b_2, \ldots a_n^K, \overline{b_n}$. Further in the expansion process signified by equation (2), and (3), either code a or b of expanded codes $A_1$ or $B_1$ may be negative, i.e. $\overline{a}$ or $\overline{b}$ as long as one of the code portions comprises a complement thereof, as evidenced by the following equations:

$$A_1 = (a)I(b^K) \quad (4)$$

$$B_1 = (\overline{a^K})I(b) \quad (5)$$

Furthermore, the code portions a and b which are amplified by the gain factor K may, when desired, be transposed in the following manner:

$$A_1 = (a^K)I(b) \quad (6)$$

$$B_1 = (a)I(\overline{b^K}) \quad (7)$$

The foregoing process can be repeated any number of times in n successive expansion stages resulting in expanded codes defined by the following general expressions:

$$A_{i+1} = (A_i)I(B_i^{K_i}) \quad (8)$$

$$B_{i+1} = (A_i^{K_i})I(\overline{B_i}) \quad (9)$$

where I comprises the $i_{th}$ expansion stage and the exponent $K_i$ is the amplification factor for the $i_{th}$ stage.

To verify that the subject expansion process satisfies equation (1), the following examples will now be presented. First consider an expansion process utilizing the following code mate pairs a and b.

$$a = A_0 = 1 \ 0 \quad (10)$$

$$b = B_0 = 0 \ 0 \quad (11)$$

where 0 represents a positive pulse of unit amplitude and 1 represents a negative pulse of unit amplitude. Applying the general expansion rule defined by equations (8) and (9) results in expanded code mate pairs $A_1$ and $B_1$ being produced as follows:

$$A_1 = 1 \ 0^K \ 0 \ 0^K \quad (12)$$

$$B_1 = 1^K \ 1 \ 0^K \ 1 \quad (13)$$

To verify that this code pair meets the requirements for forming a mate pair, the autocorrelation function $\phi_{A1}(\tau)$ of code $A_1$ can be developed in a matched filter detector in the following fashion:

$$\phi_{A1}(\tau) = \begin{array}{cccc} 1^K 0^{K2} & 0^K 0^{K2} & & (14)\\ 1 & 0^K 0 & 0^K & \\ & 1^K 0^{K2} & 0^K 0^{K2} & \\ & 0 & 1^K 1 & 1^K \\ \hline 1^K 0^{(K2-1)} & 0^K 0^{2(K2+1)} & 0^K 0^{(K2-1)} & 1^K \end{array}$$
$$\uparrow_{\tau=0}$$

In the same manner, the autocorrelation function $\phi_{B1}(\tau)$ of code $B_1$ can be developed in its respective matched filter as:

$$\phi_{B1}(\tau) = \begin{array}{cccc} 0^K 0 & 1^K 0 & & (15)\\ 1^{K2} & 1^K 0^{K2} & 1^K & \\ & 0^K 0 & 1^K 0 & \\ & 0^{K2} & 0^K 1^{K2} & 0^K \\ \hline 0^K 1^{(K2-1)} & 1^K 0^{2(K2+1)} & 1^K 1^{(K2-1)} & 0^K \end{array}$$
$$\uparrow_{\tau=0}$$

From equations (14) and (15), it can be seen that $\phi_{A1}(\tau) = -\phi_{B1}(\tau)$ for $\tau\neq 0$ and furthermore when linearly added together, compress to a lobeless impulse at $\tau=0$. This can be demonstrated below as:

$$\phi_{A1}(\tau) = 1^K 0^{(K2-1)} 0^K 0^{2(K2+1)} 0^K 0^{(K2-1)} 1^K \quad (16)$$
$$\phi_{B1}(\tau) = 0^K 1^{(K2-1)} 1^K 0^{2(K2+1)} 1 \ 1^{(K2-1)} 0^K$$
$$\phi_T(\tau) = \ . \ . \quad\quad . \ 0^{4(K2+1)} . \ . \quad\quad\quad .$$
$$\underset{\tau=0}{\uparrow}$$

Figure 2:
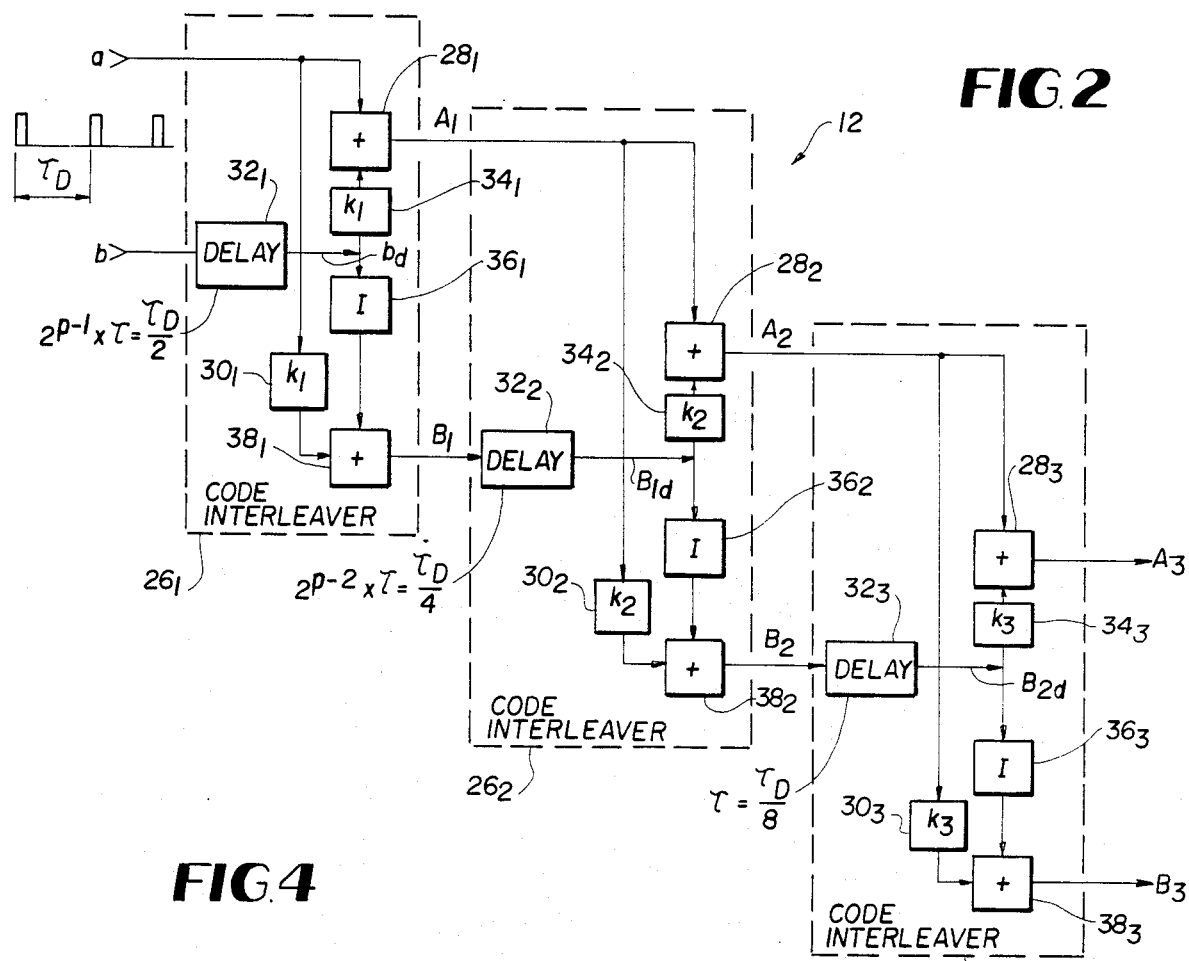
FIG. 2 is a functional diagram illustrative of the multilevel interleaved code expander shown in FIG. 1.
Figure 4:
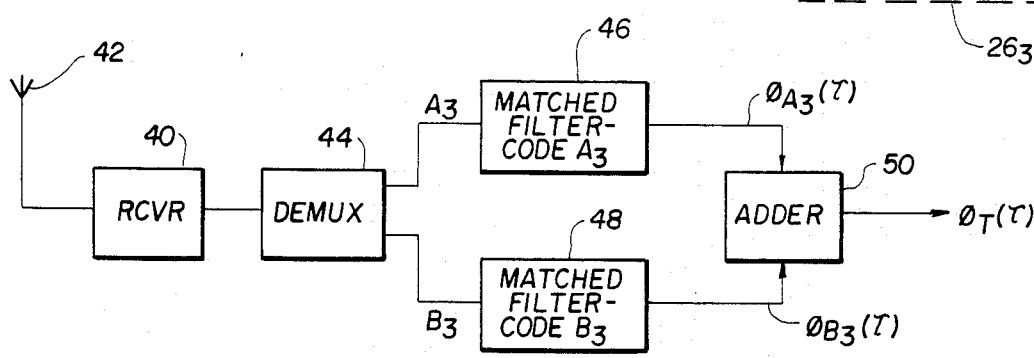
FIG. 4 is a functional block diagram of receiver apparatus of the noise modulated communications system for use with the multilevel interleaved noise code mates of this invention.

Apparatus for expanding multilevel noise codes for providing expanded interleaved code mate pairs in accordance with the subject invention, is shown in FIG. 2 while a noise modulated pulse communication system employing such codes is typically disclosed in FIGS. 1 and 4.

Referring first to FIG. 1, reference numeral 10 denotes a basic code mate generator for generating code mates a and b which are utilized to generate expanded codes $A_n$ and $B_n$ in accordance with the foregoing description. The codes a and b are fed out of the code mate generator 10 in a time related multi-bit binary digital sequence to multilevel interleaved code expander apparatus designated by reference numeral 12 and which is further shown in detail in FIG. 2 comprising an expander providing expanded code outputs of $A_3$ and $B_3$ which are applied to respective modulator circuits 14 and 16 which additionally have applied thereto a carrier frequency generated by a carrier frequency generator 18. The outputs of the modulators 14 and 16 comprise, for example, separate bi-phase modulated codes which are fed to a multiplexer 20 which operates to either time or frequency multiplex the carrier modulated signals $A_3$ and $B_3$. The output of the multiplexer 20 is fed to an RF amplifier 22 wherein an RF carrier containing the multiplexed codes $A_3$ and $B_3$ are radiated from an antenna 24.

Referring now to FIG. 2, the code expander 12 is shown comprised of three (p=3) code interleaver sections $26_1$, $26_2$ and $26_3$. The first code interleaver section $26_1$ has applied thereto basic or kernal code mates a and b where, for example, $a=a_1$, $a_2$ and $b=b_1$, $b_2$ which have an interpulse period $\tau_D$ of $8\tau$ where $\tau$ is the pulse width of each code bit. This is furthermore shown in the time related diagram of FIG. 3. Code mate a is commonly fed to a first linear adder $28_1$ and a first pulse amplifier $30_1$ having a predetermined gain of $K_1$. The code mate, however, is first fed to a digital signal time delay device $32_1$ which is typically comprised of a well known delay line. The time delay provided by the time delay device $32_1$ is one half of the interpulse period $\tau_D$ of codes a and b and which corresponds to a delayed time of $2^{p-1} \times \tau$ where p is the number of code expander stages and therefore equal to $4\tau$. The output of the time delay device $32_1$ comprises the delayed code $b_d$ which is commonly applied to a second pulse amplifier $34_1$ providing a gain factor of $K_1$ as well as a signal inverter $36_1$ which is operable to change polarity of a positive pulse to the negative pulse and vice versa and thus outputs the complement or negative of the delayed code b, i.e., $\bar{b}_d$. The output of the inverter $36_1$ is fed to a second linear adder $38_1$ along with the output of the first pulse amplifier $30_1$. Accordingly, the first linear adder $28_1$ provides an output of a first expanded code mate $A_1$ in accordance with equation (4) while the second linear adder provides an output of an expanded code mate $B_1$ in accordance with equation (5). This expansion process is furthermore shown in FIG. 3, wherein $A_1$ and $B_1$ are comprised of four bit codes where $A_1 = a_1, b_1^{K1}, a_2, b_2^{K1}$ and $B_1 = a_1^{K1}, \bar{b}_1, a_2^{K1}, \bar{b}_2$ and wherein the interpulse period $\tau'_D$ has now been reduced by half of the original interpulse period of $\tau_D$.

Figure 3:
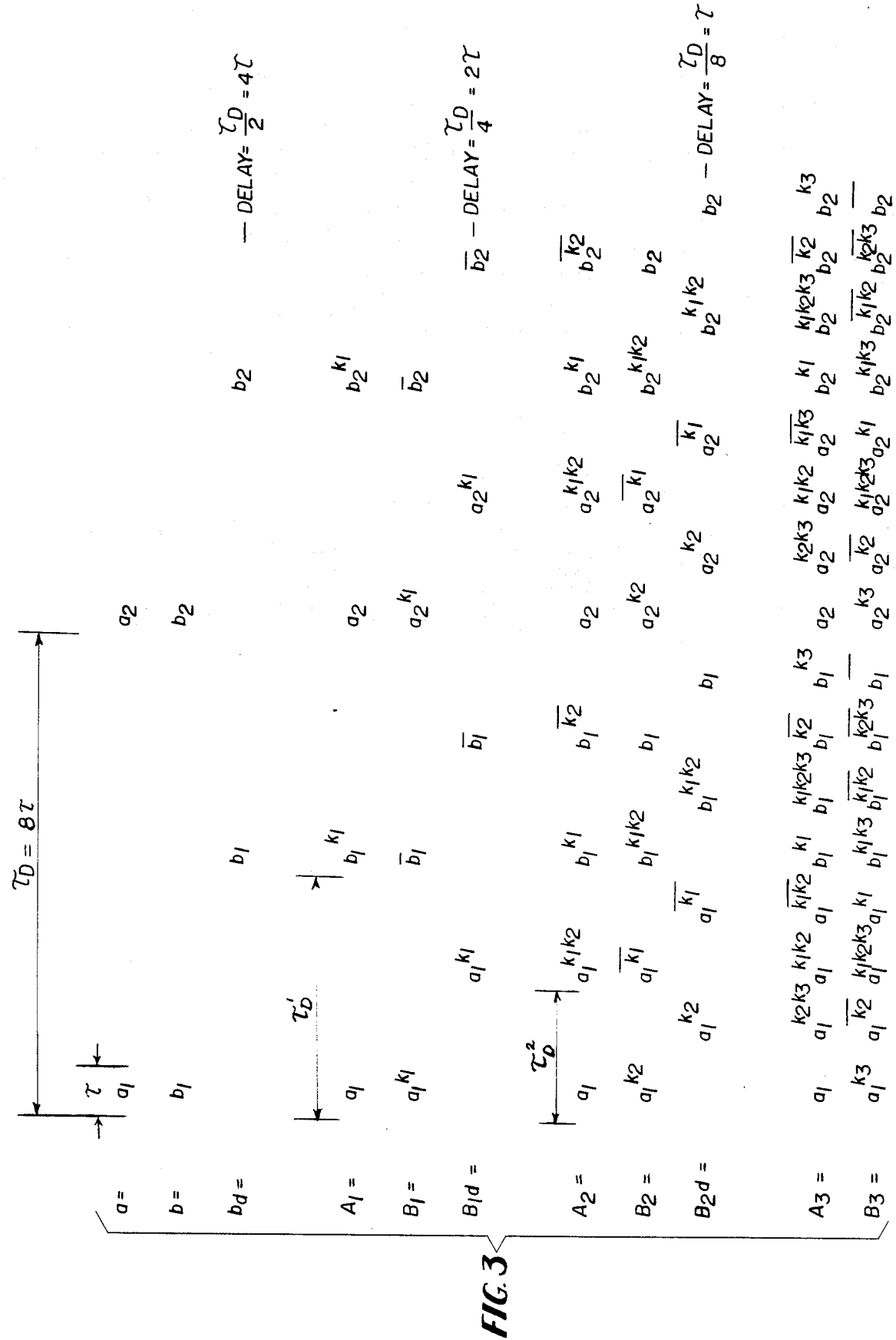
FIG. 3 is a time related diagram of the interleaved code expansion process provided by the code expander shown in FIG. 2.

The second expander stage $26_2$ is identical to the first stage $26_1$ with the exception that the time delay device $32_2$ provides a time delay of one half that of the previous stage, namely $2\tau = \tau_D/4$ which is shown graphically in FIG. 3. Additionally, the gain of the two pulse amplifiers $30_2$ and $34_2$ have a gain of $K_2$ which may or may not be equal to the gain $K_1$ of the first stage. Accordingly, the code expander stage $26_2$ provides further code expanded code mate pairs $A_2$ and $B_2$ comprised of eight code bits each having an interpulse period $\tau^2_D$ and are shown in FIG. 3 comprising the code $A_2 = a_1$, $a_1^{K1K2}$, $b_1^{K1}$, $\overline{b_1^{K2}}$, $a_2$, $\underline{a_2^{K1K2}}$, $b_2^{K1}$, $\overline{b_2^{K2}}$ and $B_2 = a_1^{K2}$, $a_1^{K1}$, $b_1^{K1K2}$, $\bar{b}_1$, $a_2^{K2}, \overline{a_2^{K1}}$, $b_2^{K1K2}$, $\bar{b}_2$.

The third code expansion stage $26_3$ again is identical to the two previous expander stages $26_1$ and $26_2$ with the exception now that the time delay device $32_3$ provides a time delay of $\tau_D/8$ and the gain $K_3$ of the pulse amplifiers $30_3$ and $34_3$ may or may not be equal to the gains $K_1$ and/or $K_2$ of the previous stages. Since $2^{p-2} \times \tau = \tau$ for a three stage code expander, the code mates $A_3$ and $B_3$ which appear at the outputs of the linear adders $28_3$ and $38_3$ respectively comprise 16 bit code structures in which there are no unoccupied time slots between adjacent code bits as shown in FIG. 3. Accordingly, $A_3 = a_1$, $a_1^{K2K3}$, $a_1^{K1K2} \ldots, b_2^{K1K2K3}, \overline{b_2^{K2}}, b_2^{K3}$ and $B_3 = a_1^{K3}$, $\overline{a_1^{K2}}$, $a_1^{K1K2K3} \ldots \overline{b_2^{K1K2}}, \overline{b_2^{K2K3}}$ and $\bar{b}_2$. The significance of the code expander apparatus as shown in FIG. 2 is that passive hardware elements may be utilized, when desired, and the quantity of functional blocks are substantially identical in developing any desired length of code structure.

Referring now to FIG. 4, there is disclosed receiver apparatus which is responsive to the code modulated RF signal radiated from the antenna 24 containing the expanded codes $A_3$ and $B_3$. Accordingly, radio receiver apparatus 40 is shown coupled to a receiving antenna 42 and is operable to receive the RF signal containing the multiplexed codes $A_3$ and $B_3$, whereupon they are fed as an IF signal to a demultiplexer 44. The demultiplexed codes $A_3$ and $B_3$ are next applied to respective matched filters 46 and 48 and are typical of the types shown and described in the aforementioned U.S. Pat. No. 4,293,953. The matched filters 46 and 48 are operable to compress the codes $A_3$ and $B_3$ to provide respective autocorrelation function outputs $\phi_{A3}(\tau)$ and $\phi_{B3}(\tau)$ in a manner analogous to equations (14) and (15). The autocorrelation function outputs of the matched filters 46 and 48 are applied to the linear adder 50 which is operable to provide a lobeless impulse output signal $\phi_T(\tau)$ in a manner similar to that shown by equation (16).

Thus what has been shown and described is the concept of expanding multilevel code mate pairs by interleaving two code mate pairs that provide autocorrelation functions of codes that are equal in magnitude but of opposite sense for all values of time delay $\tau$ except at $\tau = 0$. The use of such codes enables the implementation of systems that compress a coded signal to a lobeless impulse. Moreover, these codes can, when appropriately utilized, improve the entire field of communications, since they are capable of optimizing all transmission systems including not only communications systems, but also multiple access systems, radar systems, altimeters, fuses, missile guidance, navigation, traffic control, etc. by reducing self-interference, providing anti-jam protection, low probability of intercept (LPI), as well as providing increased range and velocity resolution and their measurement accuracy.

Having thus shown and described what is at present considered to be the preferred method and means for implementing the subject invention, it is to be noted that the same has been made by way of illustration and not limitation. Accordingly, all modifications, alterations, substitutions coming within the spirit and scope of the invention as set forth in the appended claims are herein meant to be included.

I claim:

1. A method expanding a pair of digital codes, comprising the steps of:
   generating first and second time coincident multibit digital codes of a first amplitude and predetermined equal interpulse periods between code bits;
   generating a third code comprising the complement of one of said first and second codes;
   selectively altering the amplitudes of two codes selected from said first, second and third codes to provide first and second codes of a second amplitude;
   generating a first expanded code comprised of first and second interleaved code portions by selectively combining a said first code of first amplitude with a delayed said second code of second amplitude, said delay being less than said interpulse periods of said first and second codes of a first amplitude;
   generating a second expanded code comprised of first and second interleaved code portions by selectively combining a said first code of second amplitude with a delayed said second code of first amplitude, said delay being the same as the delay of said second code of second amplitude, and
   wherein one code portion of said code portions of said first and second expanded codes comprises said third code, said third code further being selectively of a first or second amplitude.

2. The method of claim 1 wherein said delay of said second codes of first and second amplitude is substantially equal to one half the interpulse periods of said first and second codes of first amplitude.

3. The method of claim 1 wherein said one code portion comprises the second code portion of said second expanded code.

4. The method of claim 1 wherein said one code portion comprises the second code portion of said first expanded code.

5. The method of claim 1 wherein said first and second codes comprise digital codes of equal code length and wherein said second amplitude is greater than said first amplitude by a predetermined gain factor.

6. The method of claim 5 wherein said first and second digital codes comprise a pair of noise codes.

7. The method of claim 6 wherein said first and second codes comprise digital noise codes which upon matched filter detection and addition produces an impulse autocorrelation function.

8. The method of claim 5 wherein said first and second noise codes of a first amplitude are comprised of a pair of noise code mates which upon autocorrelation function detection and addition compress to a lobeless impulse and wherein said first and second expanded codes comprise a pair of equal length code mates which also compress to a lobeless impulse upon autocorrelation function detection and addition.

9. The method of claim 8 wherein said step of generating said first expanded code comprises delaying said second code of second amplitude by a time equal to one half the interbit period of said first and second codes of a first amplitude to provide a delayed code and adding it to said first code of first amplitude to provide thereby said first and second interleaved code portions of said first expanded code mate, and wherein said step of generating said second expanded code comprises delaying said second code of first amplitude by a time delay equal to one half the interbit period of said first and second codes of a first amplitude to provide a delayed code and adding it to said first code of second amplitude to thereby provide said first and second interleaved code portions of said second expanded code mate.

10. A method of expanding a pair of digital codes into a pair of multilevel digital codes comprising the steps of:
    generating first and second multi-bit digital codes having predetermined interpulse periods;
    delaying said second code by a predetermined time interval which is a function of said interpulse periods of said first and second codes;
    altering the amplitude of said first code and the delayed second code by a predetermined gain factor to provide third and fourth codes, respectively;
    combining said first and fourth codes in a first manner to form a first interleaved multilevel code;
    combining said third code and said delayed second code in a second manner to form a second interleaved multilevel code.

11. The method of claim 10 wherein said step of combining in a first manner comprises the step of adding said codes.

12. The method of claim 11 wherein said step of combining in a second manner comprises the steps of generating the complement of said delayed second code and then adding said third code and said complement of said delayed second code.

13. The method as defined by claim 12 wherein said interpulse periods of said first and second codes are equal and wherein said predetermined time interval is substantially equal to one half said interpulse periods of said first and second codes.

14. The method as defined by claim 13 wherein said first and second noise codes are comprised of a pair of code mates which upon autocorrelation function detection and addition compress to a lobeless impulse and wherein said first and second interleaved codes comprise a pair of code mates which also compress to a lobeless impulse upon autocorrelation function detection.

15. The method of claim 14 wherein said steps of expanding are repeated in successive stages with each succeeding said predetermined time delay interval being reduced by one-half the interpulse periods of the code bits of the preceding stage until the time delay interval equals the pulse width of the code bits of said first and second codes.

16. Apparatus for generating a pair of expanded digital codes from a first pair of digital codes, comprising in combination:
    means for generating first and second time multibit coincident digital codes of a first amplitude;
    means for generating a third code comprising the complement of one of said first and second codes;
    means for selectively altering the amplitudes of two codes selected from said first, second and third codes to provide first and second codes of a second amplitude;

first code interleaving means generating a first expanded code comprised of first and second interleaved code portions including a said first code of first amplitude and a second said code of second amplitude;

second code interleaving means generating a second expanded code comprised of first and second interleaved code portions including a said first code of second amplitude with a said second code of first amplitude, and wherein said one code portion of said interleaved code portions of said first and second expanded codes comprises said third code, said third code further being selectively of a first or second amplitude.

17. The apparatus of claim 16 wherein said one code portion comprises the second interleaved code portion of said second expanded code.

18. The apparatus of claim 16 wherein said one code portion comprises the second interleaved code portion of said first expanded code.

19. The apparatus of claim 16 wherein said first and second codes comprise multibit digital codes of equal code length and interpulse periods and wherein said second amplitude is greater than said first amplitude by a predetermined gain factor.

20. The method of claim 19 wherein said first and second digital codes comprise a pair of noise codes.

21. The apparatus of claim 20 wherein said first and second codes comprise digital noise codes which upon matched filter detection and addition produces an impulse autocorrelation function.

22. The apparatus of claim 21 wherein said first and second noise codes are comprised of a pair of noise code mates which upon autocorrelation function detection and addition compress to a lobeless impulse and wherein said first and second expanded codes comprise a pair of equal length code mates which also compress to a lobeless impulse upon autocorrelation function detection and addition.

23. The apparatus of claim 22 wherein said first code interleaving means includes means for delaying said second code of second amplitude by a time equal to the interpulse period of said first and second codes to provide a delayed code and means for adding the delayed said second code of second amplitude to said first code of first amplitude to provide thereby said first and second interleaved code portions of said first expanded code mate, and wherein said second code interleaving means includes means for delaying said second code of first amplitude by a time delay equal to the interpulse period of said first and second codes to provide a delayed code and means for adding the delayed said second code of first amplitude to said first code of second amplitude to thereby provide said first and second interleaved code portions of said second expanded code mate.

* * * * *